US009967509B2

(12) United States Patent
Ellis et al.

(10) Patent No.: US 9,967,509 B2
(45) Date of Patent: May 8, 2018

(54) SYSTEMS AND METHODS FOR USING PLAYLISTS

(75) Inventors: Michael D. Ellis, Boulder, CO (US); Jon P. Radloff, Castle Rock, CO (US); Robert A. Knee, Lansdale, PA (US); Michael L. Craner, Chester Springs, PA (US); Joshua Berry, Blackwood, NJ (US)

(73) Assignee: Rovi Guides, Inc., San Jose, CA (US)

( * ) Notice: Subject to any disclaimer, the term of this patent is extended or adjusted under 35 U.S.C. 154(b) by 409 days.

(21) Appl. No.: 13/309,839

(22) Filed: Dec. 2, 2011

(65) Prior Publication Data
US 2012/0079385 A1 Mar. 29, 2012

Related U.S. Application Data

(60) Continuation of application No. 13/073,285, filed on Mar. 28, 2011, which is a continuation of application
(Continued)

(51) Int. Cl.
*H04N 21/482* (2011.01)
*H04N 5/445* (2011.01)
*H04N 21/431* (2011.01)
*H04N 21/433* (2011.01)
*H04N 21/454* (2011.01)
*H04N 21/458* (2011.01)
*H04N 21/462* (2011.01)
*H04N 21/472* (2011.01)
*H04N 21/84* (2011.01)

(52) U.S. Cl.
CPC ....... *H04N 5/44513* (2013.01); *H04N 21/431* (2013.01); *H04N 21/4312* (2013.01);
(Continued)

(58) Field of Classification Search
CPC ......... H04N 21/26258; H04N 21/4825; H04N 21/25891; H04N 21/482; H04N 21/4325;
(Continued)

(56) References Cited

U.S. PATENT DOCUMENTS 5,616,876 A 4/1997 Cluts
6,182,287 B1 * 1/2001 Schneidewend ... H04N 5/44543
348/E5.105
(Continued)

FOREIGN PATENT DOCUMENTS

CN 1577599 2/2005
CN 1578445 2/2005
(Continued)

OTHER PUBLICATIONS

International Preliminary Report on Patentability dated May 22, 2009 PCT/US2007/023682.
(Continued)

*Primary Examiner* — Robert J Hance
(74) *Attorney, Agent, or Firm* — Haley Guiliano LLP

(57) ABSTRACT

Systems and methods for automatically generating a playlist of series assets and systems and methods for grouping assets of a playlist in clusters are provided. In one embodiment, series assets may automatically be included into a playlist for that series. In another embodiment, an interactive media guidance application may group assets in clusters based on one or more user selected parameters or may group assets in cluster based on automatically determined parameters. In yet another embodiment, the interactive media guidance application may group assets in clusters and display at least one identifier in connection with each cluster to indicate a basis for forming the cluster. The identifier may be a key word or catch phrase that succinctly identifies a trait or characteristic of assets in a particular cluster associated with the identifier.

26 Claims, 19 Drawing Sheets

Related U.S. Application Data

No. 12/819,391, filed on Jun. 21, 2010, now abandoned, which is a division of application No. 11/595,240, filed on Nov. 10, 2006, now abandoned.

(51) Int. Cl.
(52) U.S. Cl.
 CPC ....... *H04N 21/4334* (2013.01); *H04N 21/454* (2013.01); *H04N 21/4586* (2013.01); *H04N 21/4622* (2013.01); *H04N 21/47214* (2013.01); *H04N 21/482* (2013.01); *H04N 21/4825* (2013.01); *H04N 21/4828* (2013.01); *H04N 21/84* (2013.01); *H04N 21/47202* (2013.01)
(58) Field of Classification Search
 CPC ............. H04N 21/4335; H04N 21/431; H04N 21/4312; H04N 21/4828
 See application file for complete search history.

(56) References Cited

U.S. PATENT DOCUMENTS

| | | | |
|---|---|---|---|
| 6,204,840 B1 | 3/2001 | Petelycky et al. | |
| 6,493,002 B1 | 12/2002 | Christensen | |
| 6,526,411 B1 | 2/2003 | Ward | |
| 6,744,967 B2 | 6/2004 | Kaminski et al. | |
| 6,847,778 B1 | 1/2005 | Vallone et al. | |
| 6,850,691 B1 | 2/2005 | Stam et al. | |
| 6,987,221 B2 | 1/2006 | Platt | |
| 7,034,916 B2 | 4/2006 | Bubie et al. | |
| 7,130,616 B2 | 10/2006 | Janik | |
| 7,260,309 B2* | 8/2007 | Gutta | 386/295 |
| 7,320,025 B1 | 1/2008 | Steinberg et al. | |
| 7,321,716 B1 | 1/2008 | Vallone et al. | |
| 7,426,702 B2 | 9/2008 | Partridge | |
| 7,478,323 B2 | 1/2009 | Dowdy | |
| 7,734,660 B2 | 6/2010 | Kurosawa | |
| 7,761,812 B2 | 7/2010 | Ostojic et al. | |
| 7,777,125 B2 | 7/2010 | Platt et al. | |
| 7,934,010 B2 | 4/2011 | Foster et al. | |
| 8,005,856 B2 | 8/2011 | Spitzer-Williams et al. | |
| 8,180,770 B2 | 5/2012 | Ranasinghe et al. | |
| 8,249,426 B2 | 8/2012 | Kellock et al. | |
| 8,255,953 B1 | 8/2012 | Rowson et al. | |
| 8,468,454 B2* | 6/2013 | Poslinski | G11B 27/34 715/719 |
| 2002/0016643 A1 | 2/2002 | Sakata | |
| 2002/0057893 A1* | 5/2002 | Wood | H04N 5/4401 386/355 |
| 2002/0076203 A1* | 6/2002 | Takahashi | H04N 5/782 386/230 |
| 2002/0092021 A1 | 7/2002 | Yap et al. | |
| 2002/0122052 A1 | 9/2002 | Reich et al. | |
| 2002/0134220 A1 | 9/2002 | Yamane et al. | |
| 2002/0166123 A1* | 11/2002 | Schrader et al. | 725/58 |
| 2002/0174430 A1 | 11/2002 | Ellis et al. | |
| 2002/0194260 A1 | 12/2002 | Headley et al. | |
| 2002/0194356 A1* | 12/2002 | Chan | G06F 17/30017 709/231 |
| 2003/0067886 A1 | 4/2003 | Son et al. | |
| 2003/0078782 A1 | 4/2003 | Blair | |
| 2003/0093790 A1* | 5/2003 | Logan et al. | 725/38 |
| 2003/0103079 A1 | 6/2003 | Adatia et al. | |
| 2003/0131355 A1* | 7/2003 | Berenson | H04N 5/44543 725/46 |
| 2003/0137542 A1* | 7/2003 | Zimmerman | G06F 9/4443 715/764 |
| 2003/0146915 A1 | 8/2003 | Brook et al. | |
| 2003/0149980 A1 | 8/2003 | Hassell et al. | |
| 2003/0167471 A1* | 9/2003 | Roth | G06F 3/0481 725/87 |
| 2003/0184598 A1 | 10/2003 | Graham | |
| 2003/0235403 A1 | 12/2003 | Seo et al. | |
| 2004/0060063 A1 | 3/2004 | Russ et al. | |
| 2004/0070628 A1 | 4/2004 | Iten et al. | |
| 2004/0075694 A1 | 4/2004 | Partridge et al. | |
| 2004/0215718 A1 | 10/2004 | Kazmi et al. | |
| 2004/0233239 A1 | 11/2004 | Landesmaki | |
| 2005/0005308 A1 | 1/2005 | Logan et al. | |
| 2005/0038775 A1 | 2/2005 | Haveliwala et al. | |
| 2005/0086703 A1 | 4/2005 | Gupta et al. | |
| 2005/0094031 A1 | 5/2005 | Tecot et al. | |
| 2005/0097465 A1 | 5/2005 | Giesen et al. | |
| 2005/0114374 A1 | 5/2005 | Juszkiewicz et al. | |
| 2005/0141877 A1 | 6/2005 | Yoo et al. | |
| 2005/0149969 A1 | 7/2005 | Kumar et al. | |
| 2005/0154988 A1 | 7/2005 | Proehl et al. | |
| 2005/0166230 A1 | 7/2005 | Gaydou et al. | |
| 2005/0210507 A1 | 9/2005 | Hawkins et al. | |
| 2005/0240661 A1 | 10/2005 | Heller et al. | |
| 2005/0267995 A1 | 12/2005 | Rasmussen et al. | |
| 2006/0013554 A1 | 1/2006 | Poslinski | |
| 2006/0020662 A1 | 1/2006 | Robinson | |
| 2006/0020971 A1 | 1/2006 | Poslinski | |
| 2006/0026634 A1 | 2/2006 | LaChapelle et al. | |
| 2006/0026638 A1 | 2/2006 | Stark et al. | |
| 2006/0026811 A1 | 2/2006 | Shultz | |
| 2006/0045476 A1 | 3/2006 | Lee | |
| 2006/0059526 A1 | 3/2006 | Poslinski | |
| 2006/0107823 A1 | 5/2006 | Platt et al. | |
| 2006/0112082 A1 | 5/2006 | Platt et al. | |
| 2006/0161635 A1 | 7/2006 | Lamkin et al. | |
| 2006/0184980 A1 | 8/2006 | Cole | |
| 2006/0206811 A1 | 9/2006 | Dowdy | |
| 2006/0265421 A1 | 11/2006 | Ranasinghe et al. | |
| 2006/0267995 A1 | 11/2006 | Radloff et al. | |
| 2007/0028257 A1 | 2/2007 | Choi et al. | |
| 2007/0028258 A1 | 2/2007 | Ostojic et al. | |
| 2007/0041705 A1* | 2/2007 | Bontempi | 386/83 |
| 2007/0067301 A1 | 3/2007 | Malik | |
| 2007/0124770 A1* | 5/2007 | Guillorit | H04N 5/4403 725/56 |
| 2007/0174568 A1 | 7/2007 | Kii | |
| 2007/0180057 A1 | 8/2007 | McEnroe | |
| 2007/0198111 A1 | 8/2007 | Oetzel et al. | |
| 2007/0220566 A1 | 9/2007 | Ahmad-Taylor | |
| 2007/0286569 A1 | 12/2007 | Jung et al. | |
| 2007/0300184 A1 | 12/2007 | Song | |
| 2008/0091717 A1 | 4/2008 | Garbow et al. | |
| 2008/0101762 A1 | 5/2008 | Kellock et al. | |
| 2008/0114794 A1 | 5/2008 | Craner | |
| 2008/0115173 A1 | 5/2008 | Ellis et al. | |
| 2008/0235730 A1* | 9/2008 | Guillorit | H04N 5/44543 725/44 |
| 2012/0033950 A1 | 2/2012 | Cordray | |

FOREIGN PATENT DOCUMENTS

| | | |
|---|---|---|
| CN | 1808417 A | 7/2006 |
| DE | 10321821 A1 | 12/2004 |
| EP | 0939405 A2 | 9/1999 |
| EP | 1 463 307 | 9/2004 |
| EP | 1 850 585 | 10/2007 |
| JP | 2006-172615 | 6/2006 |
| JP | 2006-302361 A | 11/2006 |
| WO | WO00/40021 | 7/2000 |
| WO | WO-00/59214 | 10/2000 |
| WO | WO06/094131 | 9/2006 |
| WO | WO-07/120239 | 10/2007 |

OTHER PUBLICATIONS

International Search Report and Written Opinion dated Sep. 29, 2008, PCT/US2007/023682.
Roisin C: "Authoring Structured Multimedia Documents," SOFSEM: Theory and Practice of Informatics.Conference on Current Trends in Theory and Practice of Informatics. Proceedings, XX, Nov. 21, 1998, pp. 222-239 Abstract.
ISO/TC 46/SC 9: "Additional Revision to ISO/CD 15706, ISAN," Oct. 5, 1999, Video Standards and Drafts.
Sezan I et al., TV Anytime Forum Metadata Requirements, Mar. 10, 2000, Video Standards and Drafts.

(56) References Cited

OTHER PUBLICATIONS

Extended European Search Report dated Jun. 11, 2012 for EP11187533.
Lugmayr, MPEG-21 in Broadcasting Use-Case: Metadata Filtering, MPEG Meeting; Aug. 12, 2003 to Dec. 12, 2003; Waikoloa (Motion Picture Expert Group or ISO/IEC JTC1/SC29/WG11); np. M10438 (Dec. 8, 2003).
Torrens et al., Visualizing and Exploring Person Music Libraries, Proc. of the 5th Intl. Conf. on Music Inform. Retrieval, ISMIR04, 8 pp. (Jan. 1, 2004).
Borland, "Apple Unveils Music Store," CNET News, accessed online at http://news.cnet.com/2100-1027-998590.html, Apr. 28, 2003.
Examiners Report from Canadian Application No. 2669473 dated Dec. 16, 2015.

\* cited by examiner

500

Series Recording Options

Episode type: ◁ First-Run Only ▷  — 510

Channels to record: ◁ This Channel Only ▷ — 512

Keep until: ◁ Space is needed ▷ — 514

Keep no more than: ◁ 3 episodes at a time ▷ — 516

Add recording to playlist: ◁ Create playlist ▷ — 520

☐ Change these series recording options

☐ Recording options

☐ Don't change anything

FIG. 5

SYSTEMS AND METHODS FOR USING PLAYLISTS

CROSS-REFERENCE TO RELATED APPLICATIONS

This application is a continuation of U.S. patent application Ser. No. 13/073,285, filed Mar. 28, 2011, which is a continuation of U.S. patent application Ser. No. 12/819,391, filed Jun. 21, 2010, which is a divisional of U.S. patent application Ser. No. 11/595,240, filed Nov. 10, 2006, which are incorporated by reference in their entirety herein.

BACKGROUND OF THE INVENTION

This disclosure is directed to systems and methods for using an interactive media guidance application, and more particularly to using the interactive media guidance application to automatically include series assets in a playlist. This disclosure is also directed to systems and methods for using an interactive media guidance application to arrange the order of assets within a playlist.

As defined herein, an asset refers to any type of media that may be played. Such media may include all the variants of television media, music media, interactive games, and other audio and/or video media. Each asset may be associated with one or more identifiers that identify one or more aspects (e.g., name, title, an actor, a director, a producer, theme, and genre) of the asset. For example, a television programming asset for the movie "GoldenEye" may have identifiers such as "Pierce Brosnan" and "action" associated with it.

Playlists may be used to determine the order in which assets (e.g., television programs and songs) are played. With the advent of digital video recorders, which may store many assets, playlists may be used to manage the playback of recorded assets. However, in order for a user to playback assets stored on a digital video recorder or other device (e.g., server), the user may be required to create a playlist. Creation of a playlist may require affirmative actions by the user such as manually selecting assets for inclusion into a playlist. Users may find this exercise to be tedious, especially for series assets such as series recorded assets or series video-on-demand (VOD) assets. Accordingly, what is needed are systems and methods for automatically generating playlists for series assets.

Given that the number of programming choices available are vast, playlists may include a large number of assets, many of which a user may not want to play. Thus, the user may wish to play a subset of the assets (i.e., a set of assets fewer in number than the available assets), but does not want to select each and every desired asset or step through several steps to filter the playlist. Though filtering techniques are known, such techniques fail to provide flexibility in allowing a user to obtain a playlist including the most desired assets the user wishes to play. In addition, even if the playlists are filtered or rearranged, there may be no identifier indicating the basis for the filter or rearrangement of the playlist. What is needed are systems and methods for enabling a user to quickly and easily generate a playlist such that the most desired assets or only the desired assets are played back. What is also needed are systems and methods for identifying the basis for filtering or rearranging of playlists.

SUMMARY OF THE INVENTION

The above and other needs are addressed by providing systems and methods for automatically generating a playlist of series assets and system and methods for grouping assets of a playlist in clusters.

In one embodiment, series assets (e.g., television shows that belong to a series) may automatically be included in a playlist for that series. An advantage realized by automatically including series assets in a playlist is that a user is not required to filter, sort, or rearrange assets to obtain a playlist including assets for a particular series. Thus, when a user desires to playback assets for a particular series, he or she may access the playlist for that series and begin playback. The series asset playlist may include, for example, recorded assets (such as assets recorded on a digital video recorder), server stored assets (such as VOD assets), or a combination thereof. As used herein, recorded assets may refer to assets recorded directly or indirectly as a result of a user's request (e.g., such as on a digital video recorder, network video recorder, or executed directly on the video recorder or network video recorder via a user request made over a remote user interface, e.g., from a web server). As used herein, server stored assets refer to assets stored on a server or other database server (e.g., VOD server) that is remote from the user's point of interaction with the system.

An interactive media application may provide a series options screen that enables a user to configure options for a particular series and designate a playlist (e.g., create a new playlist or select an existing playlist) which may contain assets according to the configured options. For example, a user may configure series recording options for a series (e.g., StarTrek TNG) and designate a playlist for that series (e.g., TNG Playlist). When episodes of the series are recorded, assets corresponding to those episodes may be automatically included in the playlist for that series.

In another embodiment, the interactive media guidance application may rearrange or group assets in clusters based on one or more user selected parameters. To group or rearrange assets in clusters, the interactive media application may begin with a playlist which is arranged in a predetermined order, and group various ones of the assets of the playlist into clusters, where assets of each cluster meet certain parameters. For example, assume a playlist includes shows 1-9, with shows 1, 2, 8, and 9 featuring actor A, shows 3 and 4 featuring actor B, and shows 5-7 featuring actor C. Further assume the selected parameters are actors A and C. When the playlist is grouped in clusters, one cluster may include shows 1, 2, 8, and 9 (which correspond to actor A) and another cluster may include shows 5-7 (which correspond to actor C). Shows 3 and 4 may not be displayed because their attributes do not match the clustering criteria, or they may be displayed in a cluster labeled "other." It is understood that in some embodiments, the interactive media guidance application may group the same asset in multiple clusters.

The interactive media application may provide a user interface including one or more interactive parameter selection nodes which permit the user to select parameters that form the basis for clustering assets of a playlist. An advantage of the user interface of the invention is that it enables users to easily select parameters in interactive media guide environments that have limited input command control (e.g., limited to using a remote control) such as in an interactive television program guide environment. In some embodiments, the parameters are suggested by the application, e.g., based on relevance to the content stored in the users playlist as determined by some algorithmic analysis of, for example, attributes of assets within the playlist. For example, a clustering parameter of "John Wayne" as actor might not be presented as an option for a playlist in which all or none of the assets included John Wayne as an actor. In the first case, where "all" the assets contained "John Wayne" the choice of that as a parameter would not serve to divide the assets into more than one cluster and thus not effectively lead to differentiation. In the second case, where "none" of the assets contained John Wayne, depending on the implementation (filter mode or non-filter mode) you might end up with no assets in any clusters or an empty cluster (corresponding to the assets featuring "John Wayne" and an "Other" cluster containing all the assets. The nodes may include parameters derived from attributes (e.g., in television programming assets, actors, directors, producers, locations, and themes) associated with assets in the playlist. The user may select any one of these attributes as a parameter for clustering assets of the playlist. In addition, the interactive media application may allow the user to define a hierarchal status for parameters to provide an added measure of control in clustering of assets. For example, certain parameters may be given primary significance and other parameters may be given secondary significance. When assets are clustered according to both primary and second parameters, assets in each cluster may be affiliated with the primary parameter, but a subset of assets in each cluster may be affiliated with a secondary parameter.

In another embodiment, the interactive media guidance application may rearrange or group assets in clusters. and display at least one identifier in connection with each cluster to indicate a basis for forming the cluster. The identifier may be a key word or catch phrase that succinctly identifies a characteristic of assets in a particular cluster associated with the identifier. For example, a playlist may include three clusters, with each cluster having an identifier naming an actor who plays in each asset of that cluster. If desired, identifiers may be displayed in multiple levels, where a "top" level identifier may be associated with each asset of a particular cluster and where "sub" level identifiers may be associated with subgroups of assets within that particular cluster.

In another embodiment, the interactive media application may automatically select asset grouping parameters and group the assets accordingly. In some cases, the application may choose primary, secondary, or even greater level parameters for automatically creating clusters based on a hierarchy of parameters.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 5 shows an illustrative screen shot of a series recording options screen in accordance with an embodiment of the present invention;

DETAILED DESCRIPTION

Figure 1:
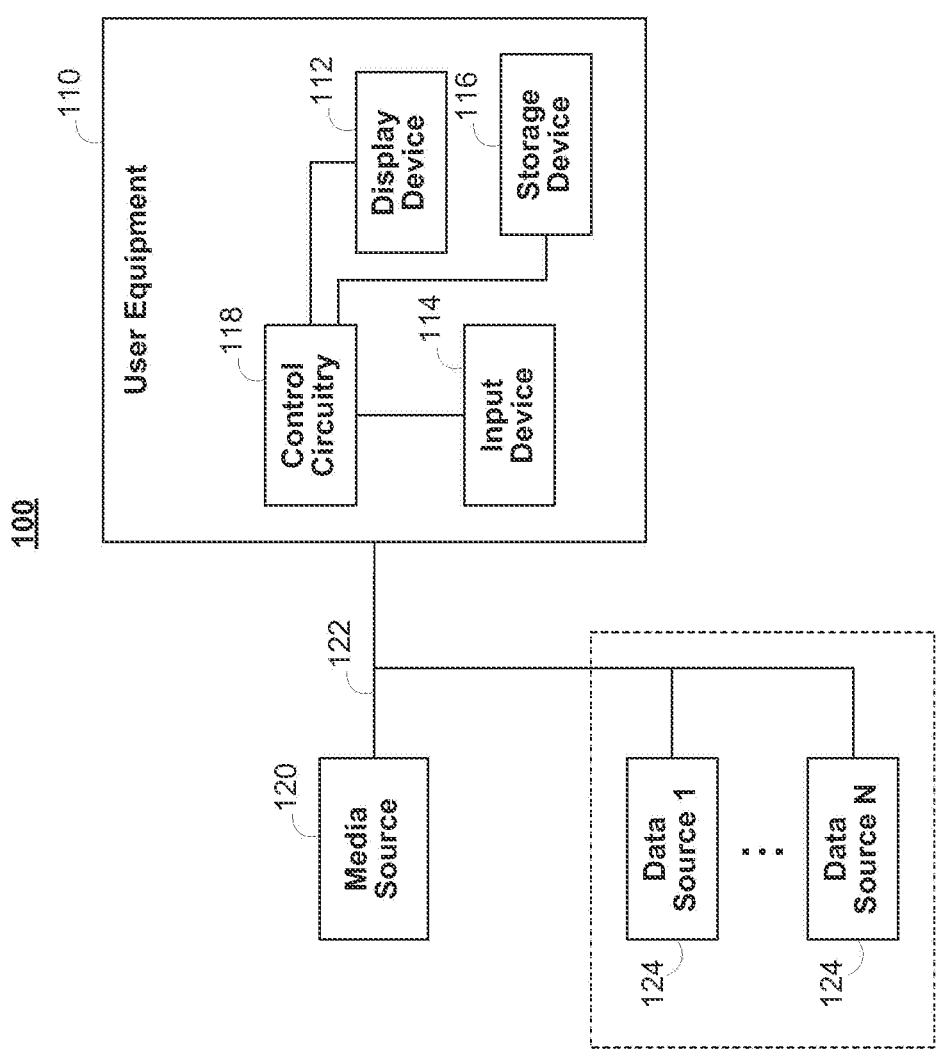
FIG. 1 is a diagram of an illustrative interactive television system in accordance with an embodiment of the present invention.

FIG. 1 shows illustrative interactive media system 100 in accordance with an embodiment of the invention. User equipment 110 receives content in the form of signals from media source 120 over communications path 122. In practice there may be multiple media sources 120 and user equipment 110, but only one of each has been shown in FIG. 1 to avoid over-complicating the drawing.

Media source 120 may be any suitable media source such as, for example, a cable system headend, satellite media distribution facility, media broadcast facility, on-demand server (e.g., VOD server), game service provider (e.g., for online gaming), Internet service provider (e.g., for providing Websites), an ordered list provider (e.g., for providing playlists), or any other suitable facility or system for originating or distributing content. Media source 120 may be configured to transmit signals over any suitable communications path 122 including, for example, a satellite path, a fiber-optic path, a cable path, an Internet path, or any other suitable wired or wireless path. The signals may carry any suitable content such as, for example, television programs, games, music, news, and/or web services. In some embodiments, media source 120 may include control circuitry for executing the instructions of an interactive media guidance application such as, for example, a client/server or online interactive media guidance application.

Media source 120 may store series playlists according to the invention which may be accessed by user equipment 110. For example, when a user sets up a series playlist for VOD assets, that playlist may be maintained at media source 120. Maintaining the playlist at media source 120 may be advantageous because media source 120 can dynamically adjust the contents of the playlist based on whether VOD assets of that series are added or removed. Maintaining the playlist at media source 120 may also be advantageous because it may be accessed by users and family members at different user equipment 110.

User equipment 110 may include any equipment suitable for providing an interactive media experience. User equipment 110 may include television equipment such as a television, set-top box, recording device (e.g., digital video recorder), video player, user input device (e.g., remote control, keyboard, mouse, touch pad, touch screen and voice recognition interface), or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV) or an Open Cable Unidirectional Receiver (OCUR) plug-in card and optionally a security access card suitable for secure delivery of content. In some embodiments, user equipment 110 may include a gaming system, a portable electronic device, such as a portable DVD player, a portable gaming device, a cellular telephone, a PDA, a music player (e.g., MP3 player), or any other suitable portable or fixed device.

User equipment 110 may include a network (not shown) that interconnects various elements of user equipment 110 of, for example, a household. Such an arrangement may permit use of a remotely located recording device (e.g., digital video recorder) which may store recorded programs that may form a basis for creating and/or maintaining series playlists.

In the example of FIG. 1, user equipment 110 includes at least control circuitry 118, display device 112, and user input device 114, which may be implemented as separate devices or as a single device. An interactive media guidance application, such as an interactive television program guide, may be implemented on user equipment 110 to control the display, on display device 112, of the media transmitted by media source 120 over path 122 and to provide interactive media guidance application features.

The media that may be played by user equipment 110 may vary widely. In fact, many different types of media may be played by user equipment 110. Many different types of media may be available because each media type may be unique in a technical sense (e.g., a particular technical implementation is required to play a particular type of media) or is considered unique in a definitional sense (e.g., a video-on-demand program may be considered a different type of media than a broadcast program). The different types of media may be classified generally or to a desired degree of specificity. For example, a general classification of media types may include a television media, a music media, and an audio and/or video media. Within each general media type, more specific and different media types are available. Television media may include, for example, broadcast television programming, recorded television programming, video-on-demand (VOD) programming, near video-on-demand (NVOD) programming, pay-per-view programming, satellite television programming, and streaming video programming. Recorded television programming may be a recording of another type of television. programming. Recorded television programs may be stored locally on user equipment 110 or remotely on networked user equipment (not shown). Recorded television programming may also be stored on a remote network video recorder server (such as media source 120 or similar remote server). Music media may include, for example, MP3 files, WAV files, MIDI files, AAC, real media, dolby digital, or other suitable format with which music can be compressed, distributed and stored on user device 110.

Display device 112 may be any suitable device such as, for example, a television monitor, a computer monitor, or a display incorporated in user equipment 110 (e.g., a cellular telephone or music player display). Display device 112 may also be configured to provide for the output of audio.

Control circuitry 118 is adapted to receive user inputs from input device 114 and execute the instructions of the interactive media guidance application. Control circuitry 118 may include one or more tuners (e.g., analog or digital tuners), encoders and decoders, processors (e.g., Motorola 68000 family processors), memory (i.e., RAN and hard disks), communications circuitry (e.g., cable modem circuitry), input/output circuitry (e.g., graphics circuitry), connections to the various devices of user equipment 110, and any other suitable component for providing analog or digital media programming, program recording and playback, and interactive media guidance features. In some embodiments, control circuitry 118 may be included as part of one of the devices of user equipment 110 such as, for example, part of display 112 or any other device (e.g., a set-top box, television and video player).

User equipment 110 may include a storage device 116 such as, for example, memory or hard-drive (e.g., digital video recorder). Only one such storage device is shown to avoid overcrowding the figure, though it is understood that additional storage devices may be used as desired. Storage device 116 may store data (e.g., series playlists) and media (e.g., recorded assets). In another embodiment (not shown) user equipment 110 may be able to access a storage device located at a remote site and store data and/or media at that remote storage device. Such a remote storage device may be referred to herein as a networked storage device or a networked digital video recorder.

In some embodiments, the interactive media guidance application may provide features to the user with a client/server approach. For example, data pertaining to series playlists may be provided to the server, which may store the data from the client. When the client generates a series playlist, it may retrieve the series playlist data from the server, or alternatively, the client may order the elements of a series playlist retrieved from the server. There may be one server for each instance of user equipment 110, one for multiple instances of user equipment 110, or a single server may serve as a proxy for each instance of user equipment 110.

Any suitable number of users may have equipment, such as user equipment 110, connected to media source 120 and data source 124. But for clarity of illustration, the equipment of only a single user is shown. The equipment of the plurality of users may be connected to media source 120 and data source 124 using a cable television network, a local area network (LAN), a wireless network, or any other suitable means. In some embodiments, the equipment of the plurality of users may be connected to each other using any suitable means.

User equipment 110 may receive interactive media guidance application data from one or more data sources 124. Data sources 124 may provide data for a particular type of content or for a particular application. For example, one data source 124 may provide data for non-on-demand assets (e.g., non-pay and pay-per-view programs), and another may provide data for on-demand assets (e.g., VOD programs). Or, for example, a single data source may provide both of these types of data. For example, one data source 124 may provide data for an interactive television program guide. Another data source 124 may provide data for series playlists. Another data source 124 may, for example, provide data for another interactive application (e.g., a home shopping application). In some embodiments, data sources 124 may provide data to the interactive media guidance application using a client/server approach. There may be one server per data source, one for all sources or, in some embodiments, a single server may communicate as a proxy between user equipment 110 and various data sources 124. In some embodiments, data sources 124 may provide data as an online interactive media guidance application. In such embodiments, data source 124 may include control circuitry for executing the instructions of the online media guidance application.

FIG. 1 shows media source 120 and data sources 124 as separate elements. In practice, their functionality may be combined and provided from a single system at a single facility, or multiple systems at multiple facilities. For example, one media source 120 and data source 124 may be combined to provide VOD content and associated VOD data.

For the purposes of clarity, the following discussion may sometimes describe an embodiment in which the interactive media guidance application is an interactive program guide. It will be understood, however, that the following discussion and the features discussed may be applied to any interactive media guidance application.

Systems and methods for generating ordered lists of series assets according to the present invention are provided. As defined herein, a series asset may be an asset related to a particular series of assets. For example, a series may refer to a particular television show (e.g., Star Trek) and the assets may refer to episodes of that particular television show. The assets of series playlists may include episodes from one or more seasons of a series, a user- or application-selection of episodes of a series, or any other desired group of episodes.

Figure 2:
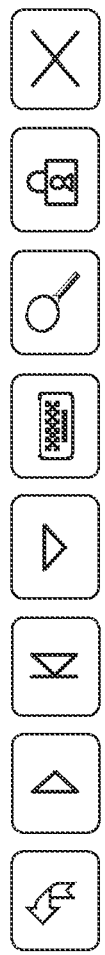
FIG. 2 shows an illustrative screen shot of a playlist for a series in accordance with the principles of the present invention.

FIG. 2 shows an illustrative screen shot of a playlist 200 for the Star Trek TNG series in accordance with the principles of the present invention. Playlist 200 shows six assets which are included in the Star Trek TNG series. As shown, the assets are shown in the order in which they are to be played. It will be understood that the order in which assets are played may be rearranged manually or automatically. See commonly assigned U.S. patent application Ser. No. 11/324,193, filed Dec. 29, 2005, for a detailed discussion of systems and methods for reordering the arrangement of assets of a playlist, the disclosure of which is hereby incorporated by reference herein in its entirety.

An advantage of playlists is that they provide substantial viewing flexibility and information for the user. Viewing flexibility may be realized in that a user may stop playback of a given asset or playlist and return to the exact same place in the asset or playlist for continued playback. In addition, the order of the assets may be rearranged. Various information may be provided to the user in connection with playlists. For example, as shown in FIG. 2, the asset (e.g., Descent, Part 1) currently being played back may be highlighted. If desired, the user may select an asset by navigating a highlight region and enter a command to view information (e.g., program summary) of the asset.

Figure 3:
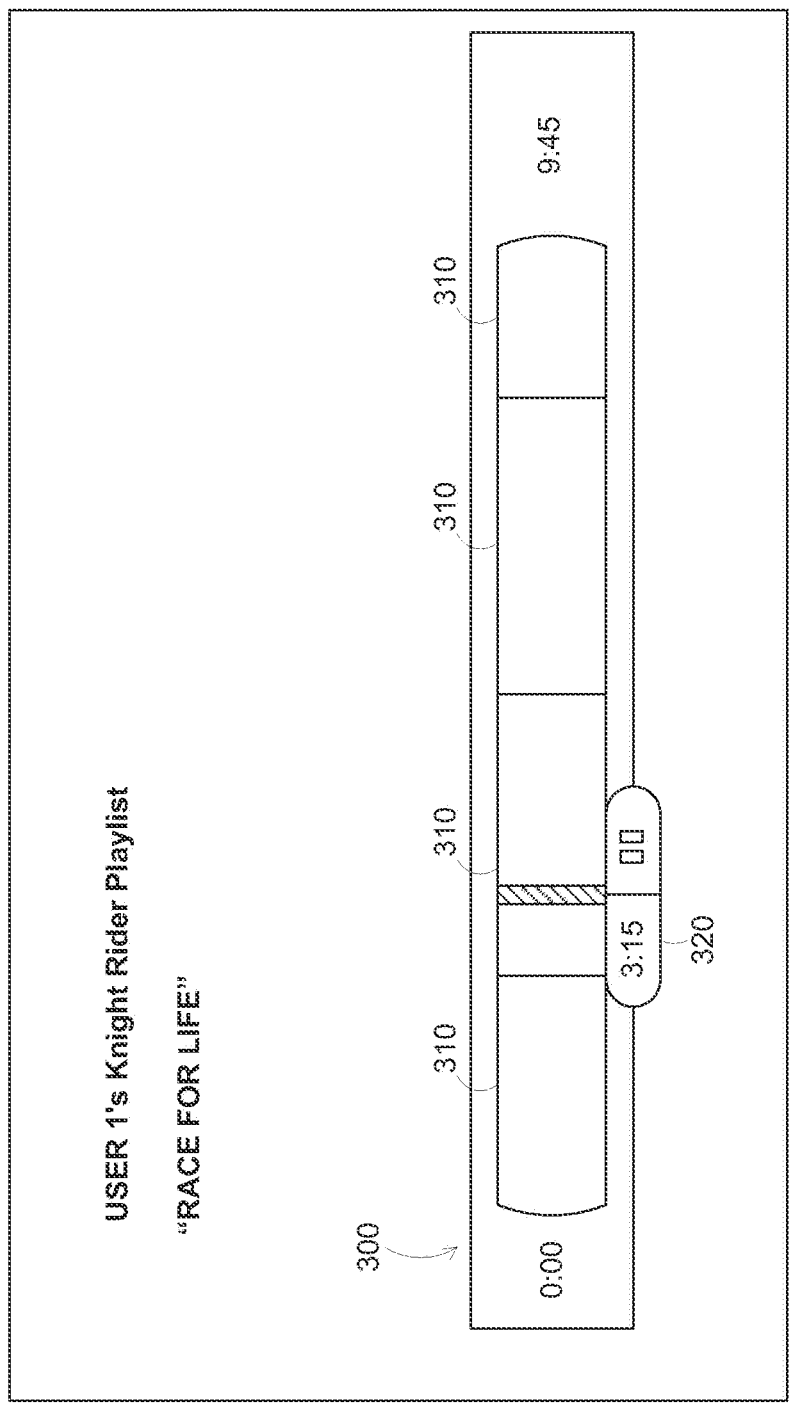
FIG. 3 shows a playlist transport bar according to the invention that may be displayed for a series playlist.

FIG. 3 shows a playlist transport bar 300 according to the invention that may be displayed for a series playlist. Playlist transport bar 300 may show information relating to the playlist in a graphically oriented context. For example, each cell 310 may correspond to an asset in a playlist, and may be sized to reflect the playback time of a particular asset. An information region 320 may be positioned to indicate the current playback position with the playlist and an asset within the playlist. As shown in FIG. 3, the information region includes a pause indicator to reflect that playback has been paused at the 3:15 position of the playlist. When playlist transport bar 300 is displayed, the name of the currently played back asset (e.g., "Race for Life") may be displayed, as well as the name of the series playlist (e.g., "USER1's Knight Rider Playlist"), as shown. It is understood that many variations on the playlist transport bar may be practiced without limitation with respect to the series playlists of the present invention, including, without limitation, vertically oriented playlists. Additional information on playlist transport bars such as that shown in FIG. 3 may be found in commonly assigned U.S. patent application Ser. No. 11/366,863, filed Mar. 2, 2006, the disclosure of which is hereby incorporated by reference herein in its entirety.

The series asset, which is retrieved for playback, may be stored in any number of different ways. Assets may be recorded locally, for example, on a digital video recorder or remotely, for example, on a networked digital video recorder. Assets may be stored on a server such as a VOD server, near video-on-demand server, real-time media server (such as those used in a World Wide Web or Internet context), or any other suitable type of server. The interactive program guide may generate series playlists specific to a particular type of stored asset (e.g., locally stored asset, remotely stored asset, or server stored asset), one or more selected stored assets, or all types of stored assets. For example, a series playlist can include assets recorded on a digital video recorder, recorded on a networked digital video recorder, stored on a server, or a combination thereof.

The series playlists according to the invention may be dynamic in that assets may be added, removed, and rearranged to provide a different playback order of the assets. Assets may be added manually by the user or may be added automatically. When manually added, the user may, for example, access a menu (by pressing the appropriate button or sequence of buttons on an input device) in connection with the series asset and cause the asset to be included in a playlist for that series. Assets may be automatically added in a number of different scenarios. For example, when a series asset is recorded (e.g., locally or remotely), it may be automatically included into the playlist for that series, and if a playlist for that series does not exist, the program guide may generate a playlist (with or without user approval) and include the asset in the newly created playlist. As another example, when a server stored series asset (such as a VOD asset) is made available, it may be automatically added to the playlist for that series.

Placement of the added assets in the playlist (e.g., beginning or end) may be based on a number of criteria. For example, if the playlist is arranged in an air date order, and the added asset aired at a time that would place the asset in the middle of the playlist, then the asset may be placed in the middle of the playlist. It will be understood that the program guide may place added assets in the appropriate logical order for a given playlist.

Series assets may be removed manually by the user or automatically. When removed manually, the user may, for example, access a menu and cause that asset to be deleted. The user may cause a stored asset (e.g., VOD server asset) to be removed from a playlist even though the series asset is still available for viewing on the server. Automatic removal of assets may occur in any number of different scenarios. For example, locally or remotely recorded assets may be removed after a predetermined time or after the user watches the asset. In addition, if a user deletes the recorded asset from the digital video recorder (whether local or remote), it too may be deleted from the playlist. For playlists having a fixed number of assets, an asset may be removed to make room for a newly added asset. When an asset stored on a server (e.g., VOD server) is removed, it may be automatically removed from a playlist including that asset. In some embodiments, a user may be notified when one or more assets are removed from a playlist, particularly if the asset was manually added by the user to the playlist as opposed to having been added automatically. Similarly notifications of additions may be provided when new elements are added to a playlist automatically. Such notifications may be done, or example, by a dialog and/or by some type of highlighting (e.g., grey title for removed assets, bold or color differentiated title for added assets).

A series playlist according to the invention may be provided or generated in a number of different ways. In one approach, a user may select an asset of a series or a series in a menu (e.g., a VOD menu of grid showing channels and time) and be provided with an option to create a playlist for the series. Thereafter, new assets that are recorded or become available on a server (e.g., VOD server) pertaining to that series may be added to that playlist. Additionally, already existing recorded assets or assets available on a server (e.g., VOD server) may be included in the playlist for that series. The program guide may continually update the playlist to reflect changes in the availability of assets (e.g., a recorded asset is deleted or added or is no longer available on or added to a server) or if a user adds, removes, or rearranges assets in a playlist.

Figure 4:
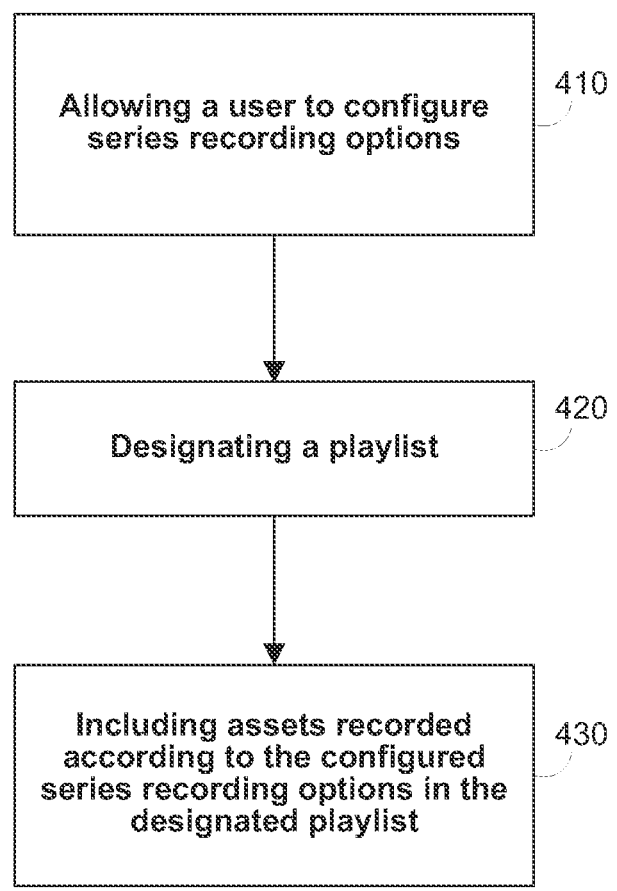
FIG. 4 shows a flowchart illustrating steps that may be taken to generate a playlist of series recorded assets in accordance with an embodiment of the present invention.

FIG. 4 shows a flowchart illustrating steps that may be taken to generate a playlist of series recorded assets in accordance with the principles of the present invention. Reference is made. to FIG. 5 during the discussion of FIG. 4. FIG. 5 shows an illustrative series recording options screen 500 in accordance with the principles of the present invention.

At step 410, a user is allowed to configure series recording options. Here, the user may be permitted to set one or more series recording parameters for a particular series (which may have been previously selected). Screen 500 shows several parameters which may be selected to dictate how the interactive program guide records assets. Four different parameters are shown: "episode type" 510, "channels to record" 512, "keep until" 514, "keep no more than" 516, and "Add recording to playlist" 520. The user may toggle through options for each parameter by pressing left or right arrows on a user input device (e.g., remote control) or navigating a highlight region to the left or right arrows as shown and pressing a predetermined button on the user input device (e.g., the "OK" button). It is understood that default settings (e.g., factory or user-defined) may be set for each parameter when a user initially accesses screen 500 for a selected series. It is further understood that the present invention is not limited to the parameters shown or discussed herein, and that additional parameters may be added, or that existing parameters may be omitted.

The "episode type" 510 parameter allows the user to record one or more different classifications of assets. For example, first-run only assets (e.g., new, previously unavailable assets), first-run and repeat assets, or all assets and duplicates thereof of a selected series may be selected as an episode type parameter.

The "channels to record" parameter 512 may allow a user to define one or more channels on which the assets of the selected series are to be recorded. For example, a user may select a "this channel only" option or an "all channels" option. As another example, the user may manually select channels by entering channel numbers or by navigating through a listing of channels and selecting the desired channels.

The "keep until" parameter 514 may allow a user to define how long a recorded series asset is stored on a digital video recorder. A keep until parameter option may include, for example, "space is needed" option, which may store a recorded asset until the storage space in which the recorded asset resides is needed. Another option may include an "I delete" option which may permanently store the recorded asset until the user affirmatively deletes it. Yet another option may include a "time expired" option which may delete a recorded asset after a predetermined period of time. Yet another option may include a "FIFO" option (first-in, first-out) of length N assets, where N is an integer representing the total number of assets that may be recorded for the series. In this option, the program guide may store N assets. When the N+1 asset is recorded, the first asset is removed from the playlist to make room for the N+1 asset. When the N+2 asset is recorded, the second asset is removed, and so on. The depth of such a FIFO may be determined by N, the number of total assets to store, by a memory size limit (e.g., 50 MB), or by a duration limit (e.g., 5 hours).

The "keep no more than" parameter 516 allows the user to define the number of assets for a selected series that may be stored. The user may select, for example, an "all episodes" option which may result in the recording of all assets for the selected series. Another option may be a "designated number" option which enables a user to select the number of assets to be recorded for a selected series.

Referring back to FIG. 4, at step 420, a playlist may be designated. In the "add recording to playlist" parameter 520, the user may select a "create new playlist" option or "select an existing playlist" option. Selection of the "create new playlist" option may provide an overlay or screen that permits a user to enter a playlist name, or select from provided options. Selection of the "select an existing playlist" option may provide an overlay or screen including a list of existing playlists from which the user can select a desired playlist. In some embodiments a new playlist may be created and named automatically based on the name of the series.

At step 430, assets recorded according to the configured series recording options are included in the designated playlist. Thus, an advantage of this playlist is that when a user wishes to playback a certain set of assets (such as assets for a certain series), the user can select the playlist for that series and begin playback. In addition, such playlists provide an added level of convenience in that the user is not required to create a series playlist from a relatively large list of assets (e.g., recorded assets). That is, according to the present invention, when a user configures recording options for a series, recorded assets pertaining to that series are automatically included into a playlist for that series.

Persons skilled in the art will appreciate that the steps shown in FIG. 4 are merely illustrative and that additional steps may be added. For example, a step illustrating how a user enters a series recording options screen may be provided. A user may enter a series recording options screen using any number of suitable approaches. In one approach, a user may be viewing an asset which happens to be part of a series. While viewing the asset, the user may press a predetermined button (e.g., a recording button) on an input device to access a series recording options screen such as screen 500 of FIG. 5. In another approach, the user may access the series recording options screen by interacting with a cell (e.g., selecting a cell containing an asset of series) in a screen guide (e.g., a grid guide) of assets.

An example of how a user may create a series recording asset playlist is now discussed. Assume that a user wishes to set a series recording for the television program "24" on Fox. The user may, for example, initiate a series recording by selecting an asset of "24" and entering a command to cause a series recording options screen (such as screen 300) to be displayed. When the recording options screen is displayed, the user may configure recording options by selecting parameters, as discussed above. Assume the user selects parameters that instruct the interactive program guide to record new episodes on Fox. The user may further select a parameter that causes recordings to be added to a new or existing playlist. Assume the user creates a new playlist labeled "24 Playlist." When the user confirms the configured options for the series recording, the interactive program guide may then group subsequent recordings of the new episodes of "24" in the "24 Playlist." The user may access the "24 Playlist" to playback episodes of "24" when desired.

Figure 6:
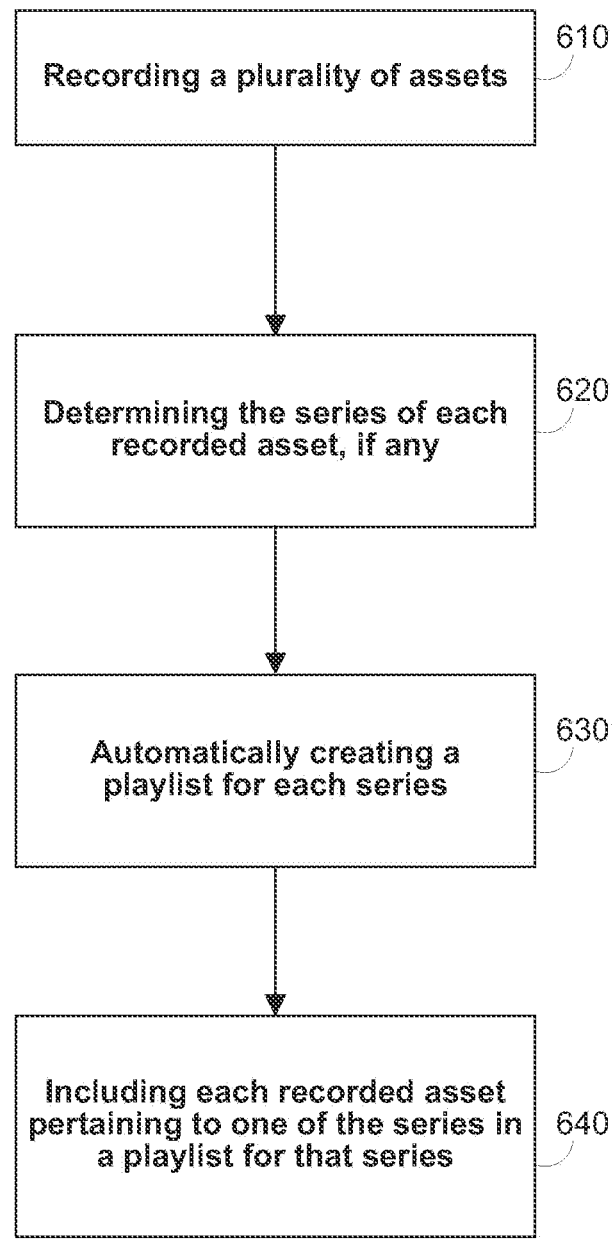
FIG. 6 shows a flowchart illustrating steps that may be taken to include recorded assets in a playlist automatically created based on the recorded assets in accordance with an embodiment of the present invention.

FIG. 6 shows a flowchart illustrating steps that may be taken to include recorded assets in a playlist automatically created based on the recorded assets in accordance with the principles of the present invention. The flowchart in FIG. 6 refers to an embodiment where the interactive program guide automatically generates playlists for each series when a predetermined number of assets (e.g., at least two assets) belonging to a particular series have been recorded. In addition, this embodiment may not require affirmative actions (e.g., designating a playlist in a series recording options menu) in order to have series recorded assets included in a playlist. If desired, the user may be permitted to set a threshold of a number of assets of a particular series that have to be recorded to cause the interactive program guide to create a playlist for that series. For example, the user may set the threshold to be three, requiring that at least three assets of the series be recorded before a playlist is created for that series.

Beginning at step 610, several assets are recorded. The recorded assets may include assets that belong or do not belong to a series. At step 620, a determination of which series, if any, correspond to the recorded assets is performed. At step 630, a playlist for each determined series may be automatically created. If desired, a playlist for a given series may not be created unless it is determined that at least a predetermined number of assets belonging to that series have been recorded or are presently stored on the digital storage device. When the playlist is created, the interactive program guide may assign a logical name for each created playlist (e.g., by processing metadata or other data associated with the recorded assets). For example, if episodes of Lost are recorded, the program guide may assign the name Lost to the playlist created for Lost.

At step 640, recorded assets belonging to a particular series may be included in a playlist for that series. When the user accesses a list of playlists, the user may have the option to select one of the automatically generated playlists for playback of the assets included therein.

Persons skilled in the art will appreciate that the steps in FIG. 6 are merely illustrative, and that additional steps may be added and existing steps may be modified. For example, step 630 may be modified to automatically create a playlist for a series only if at least a predetermined number of assets have belonging to that series have been recorded.

Figure 7:
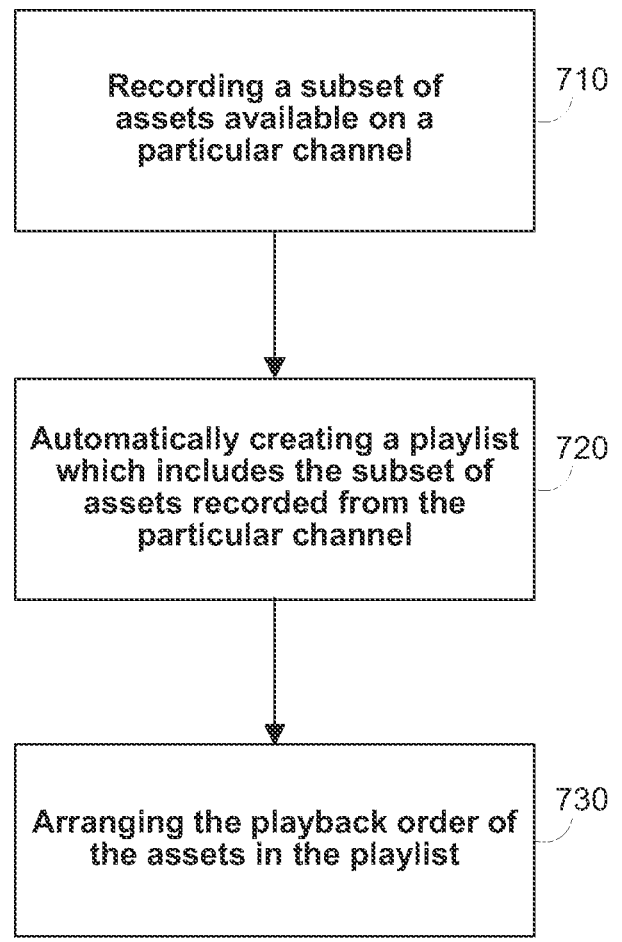
FIG. 7 shows a flowchart illustrating steps that may be taken to create a playlist of recorded assets in accordance with an embodiment of the present invention.

FIG. 7 shows a flowchart illustrating steps that may be taken to create a playlist of recorded assets in accordance with the principles of the present invention. The embodiment described in connection with FIG. 7 refers to a playlist created for a subset of assets recorded from a particular channel and which has its assets arranged in a particular order. Beginning at step 710, a subset of assets available on a particular channel are recorded. The subset may include assets recorded according to any suitable number of criteria. For example, the subset may include assets recorded during a predetermined period of time (e.g., from eleven o'clock to two o'clock) on a given channel. The subset may include assets recorded on the channel that match a predetermined theme or themes (e.g., comedy or action). The subset may include an ongoing recording of a program on a particular channel that occurs at the same time every day or week.

At step 720, a playlist is automatically created to include the subset of assets recorded from the particular channel. The maximum number of assets recorded at any given time may be limited to N assets. A FIFO arrangement may be used to eliminate assets from the list when the total number of assets exceeds N assets.

At step 730, the playback order of the assets in the playlist may be arranged according to one or more predetermined criteria. For example, the order of the assets may be arranged by time, title, alphabetical order, first air date, categories (e.g., themes), or any other suitable criteria. The program guide may automatically arrange the order of the assets in the playlist or the user may instruct the program guide which criteria should be used to arrange the playlist. Alternatively, the user may manually move one or more assets to different locations within the playlist. Several examples of rules for arranging assets in a playlist and manually rearranging assets may be found, for example, in U.S. patent application Ser. No. 11/324,193, filed Dec. 29, 2005, which is incorporated by reference herein in its entirety.

Figure 8:
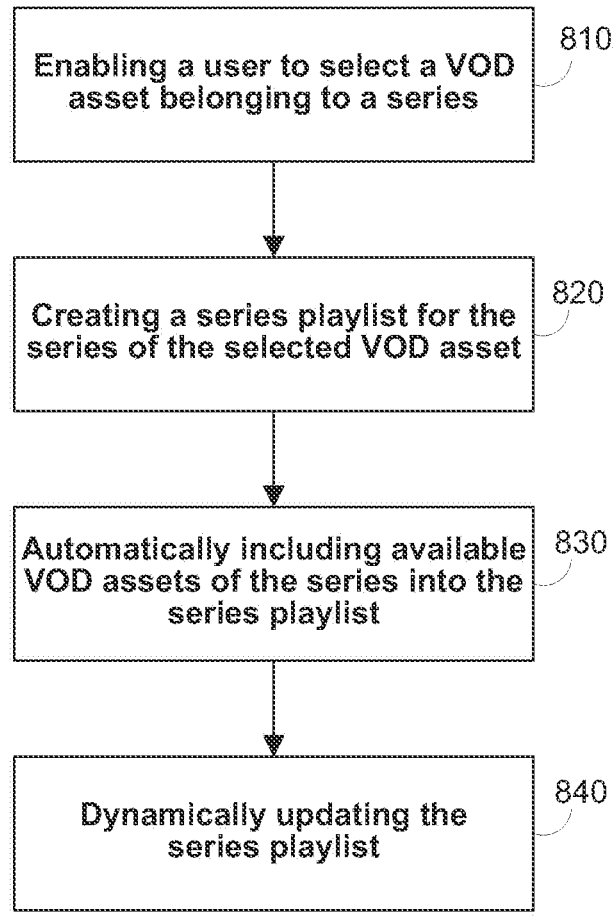
FIG. 8 shows a flowchart illustrating steps that may be taken to generate a playlist of series VOD assets in accordance with the principles of the present invention.
Figure 9:
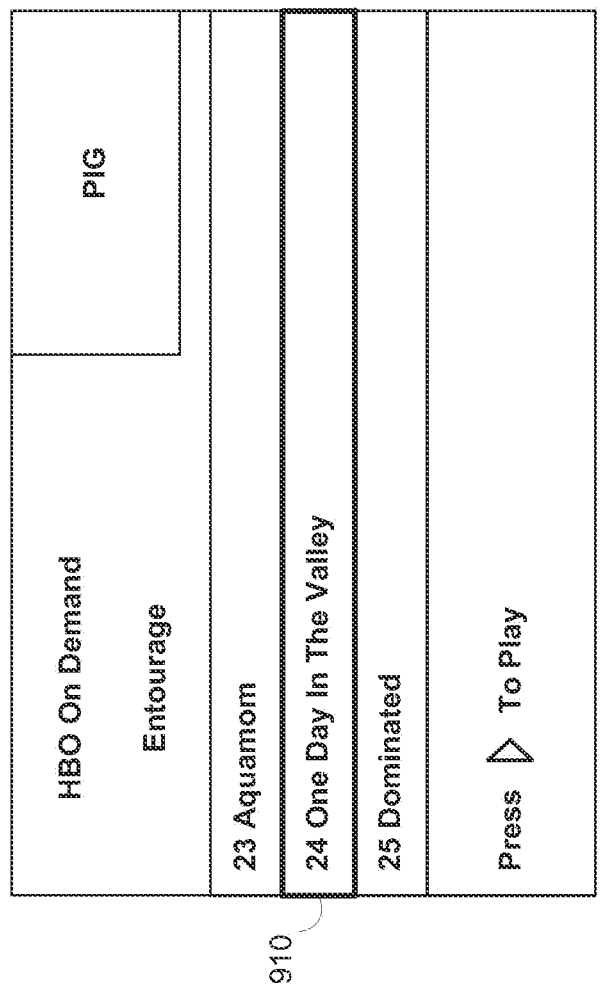
FIGS. 9-11 show illustrative screen shots that may be displayed in connection with VOD series assets and playlists in accordance with the principles of the present invention.
Figure 10:
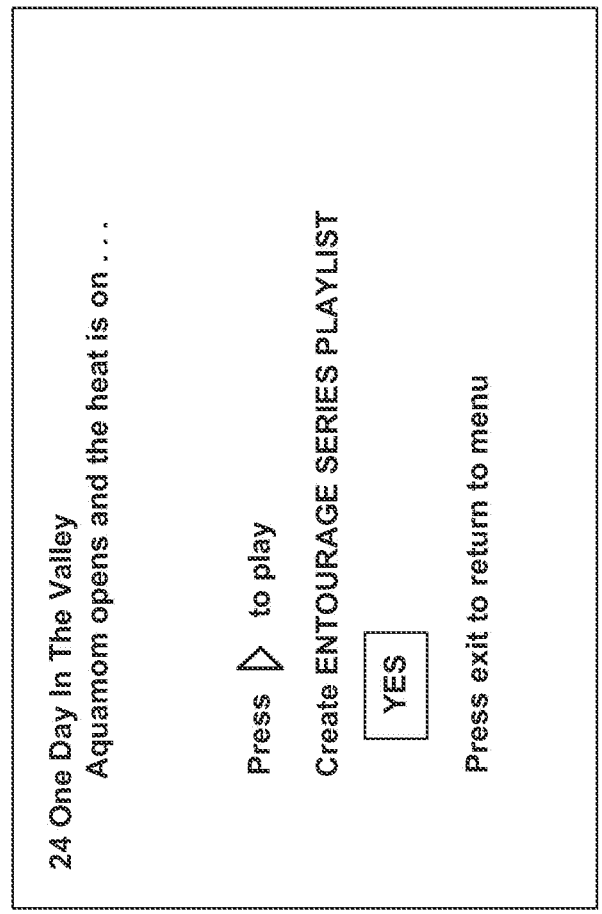
Figure 11:
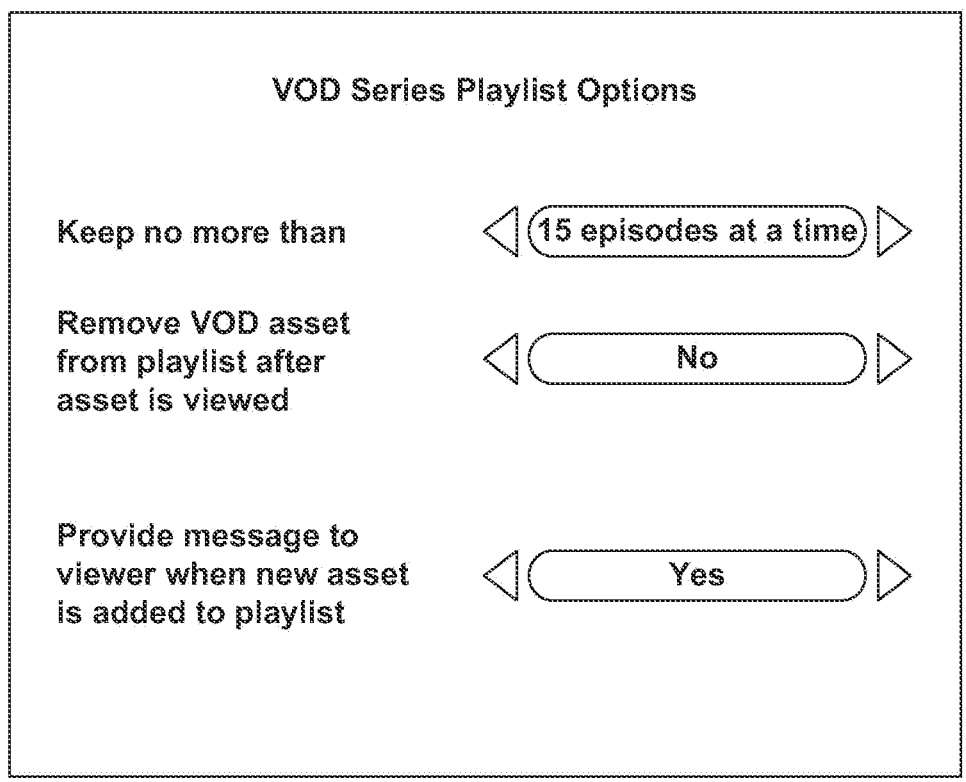

FIG. 8 shows a flowchart illustrating steps that may be taken to generate a playlist of series VOD assets in accordance with the principles of the present invention. Reference is made to FIGS. 9-11 during the discussion of FIG. 8. At step 810, a user is allowed to select a VOD asset belonging to a series. This is illustrated in FIG. 9, where a highlight region 910 is navigated to a particular VOD asset. Upon selection of the asset (e.g., by pressing an OK button or equivalent), a screen shot such as that shown in FIG. 10 may be provided to the user. In FIG. 10, the user may navigate highlight region 1010 to "YES" to create a playlist for the selected series. When "YES" is selected, a series playlist for the series of the selected VOD asset may be created, as indicated in step 820 of FIG. 5. If desired, a VOD series playlist options screen, such as that shown in FIG. 11, may be provided when the user selects "YES." The VOD series playlist options screen may enable the user to specify several options with respect to the playlist. For example, the user may specify how many assets may be kept in the playlist, whether to keep the asset in the playlist after it is subsequently viewed (or if it has been previously viewed by the user), and whether to provide a message to the user when a new asset has been added to the playlist. It is understood that other options may be included the VOD series playlist options screen.

At step 830, the program guide may automatically include available VOD assets of the series into the series playlist. For example, referring to FIG. 11, all of the assets for the VOD series may be included in the playlist, or just a subset. It is understood that depending on various VOD playlist options settings, those VOD assets which have already been viewed by the user may not be included in the playlist. That is, the program guide may maintain a viewer profile for a user and may monitor which assets have been viewed prior to the asset being included into a playlist.

At step 840, the program guide may dynamically update the series playlist. By dynamically updating the series playlist, the program guide may take into account rearrangements of the assets, removal of assets no longer available on the server or which have been viewed, and addition of assets that become available on the server in connection with the VOD series playlist.

Figure 12:
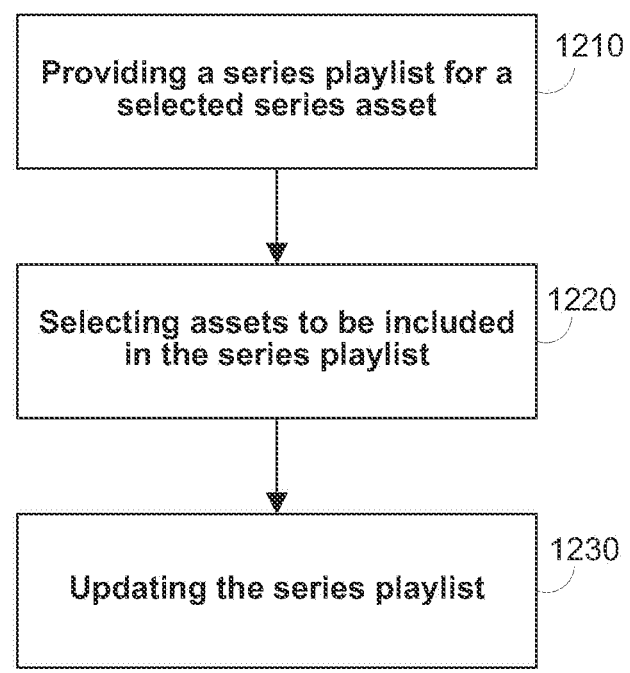
FIG. 12 shows a flowchart illustrating steps that may be taken to generate a playlist in accordance with the principles of the present invention.

FIG. 12 is a flowchart illustrating steps that may be taken in connection with a series playlist in accordance with the principles of the present invention. At step 1210, a series playlist for a selected series asset is provided. A series playlist may be provided, for example, when a user selects an asset of a series or a series in a menu (e.g., a VOD menu or a grid showing channels and time) and is provided with an option to create a playlist for the series.

The user may be provided with an opportunity to customize options with respect to the series playlists (this step is not shown). For example, the user may set a limit as to the number of assets that may be included in the playlist, determine whether only recorded assets, only server-stored assets, or all types of assets (e.g., locally and remotely recorded assets, or server-stored assets) are included in the playlist, set parameters that dictate the order in whish assets are arranged in the playlist, set parameters that dictate how the playlist is updated (e.g., how assets are added or removed), and any other suitable options.

At step 1220, assets are selected for inclusion in the series playlist substantially immediately after the playlist is created. The program guide may search, for example, the locally and remotely recorded assets and assets stored on a server and include the assets that belong to the series. It is understood that the program guide may, for example, limit the search to just a particular type of asset (e.g., recorded assets), thereby limiting the inclusion of assets to that particular type of asset (e.g., recorded assets). When the assets are included in the playlist, the program guide may arrange the order of the assets to predetermined criteria. See, for example, U.S. patent application Ser. No. 11/324,193, filed Dec. 29, 2005 for an example of how assets may be arranged.

At step 1230, the series playlist is updated to reflect changes (e.g., the addition, removal, and/or arrangement of assets) in the playlist. In addition, the program guide may update, for example, the position of a visual indicator to show the current playback position within the playlist. For example, if the playback position is in an asset that is removed, the program guide may automatically advance the playback position (and the visual indicator) to the start of the next asset in the playlist.

In another embodiment, playlists may be created to include the most N recent assets for a particular series. Such playlists need not be limited to recorded assets, but can include other assets which can be retrieved and played such as VOD assets. This playlist may store the N most recent assets using a FIFO control to decide which assets are removed when new assets need to be added. Assume the user has an interest in Modern Marvels on the History Channel and creates a Modern Marvels Playlist. The program guide may maintain a list of the ten most recent Modern Marvels episodes the user can playback when desired.

In yet another embodiment, pre-defined playlist may be stored on user equipment or accessed via a client-server arrangement. Such playlists may be suitable for use with third party vendors who wish to push content (e.g., advertise products, services, or television programming such as movies and pay-per-view events) to viewers. For example, a third party may provide a playlist of movie trailers. Thus, when a user desires to see which movies are available, for example, via pay-per-view, he or she may access the movie trailer playlist and playback the assets contained therein. The program guide may allow the user to order a movie while the assets are being played back.

Figure 13:
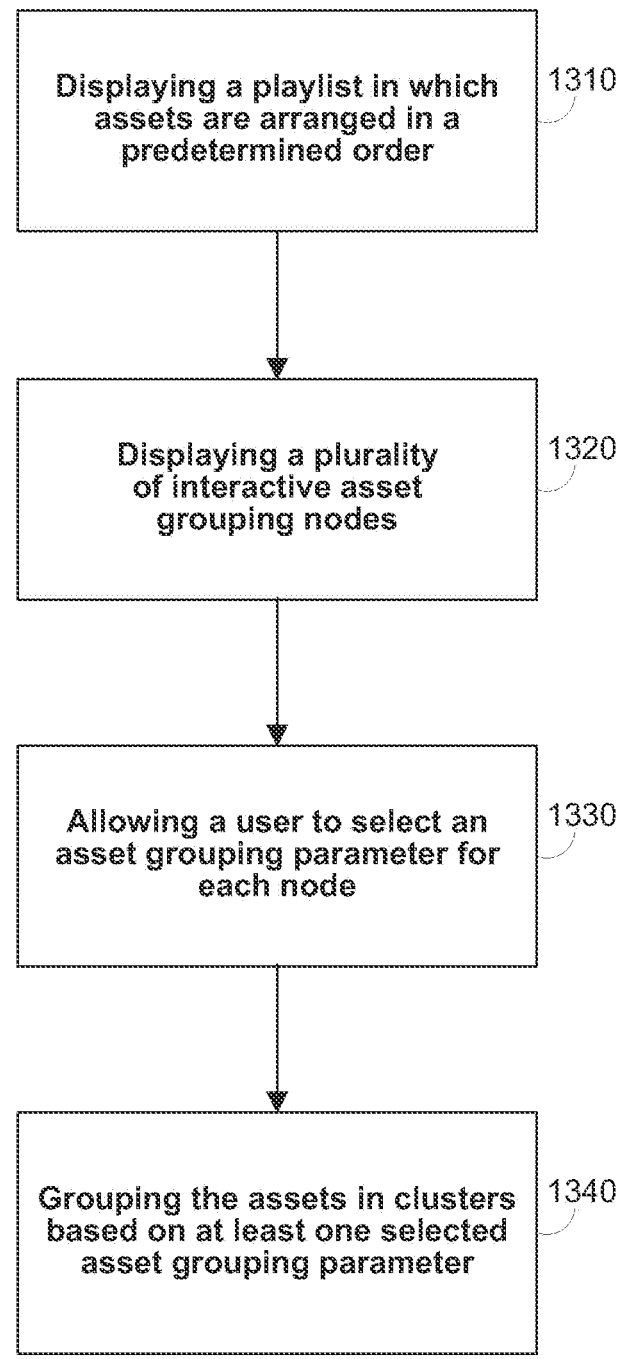
FIG. 13 shows a flowchart illustrating steps that may be taken to group assets of a playlist in clusters based on one or more selected asset grouping parameters in accordance with an embodiment of the present invention.
Figure 14A:
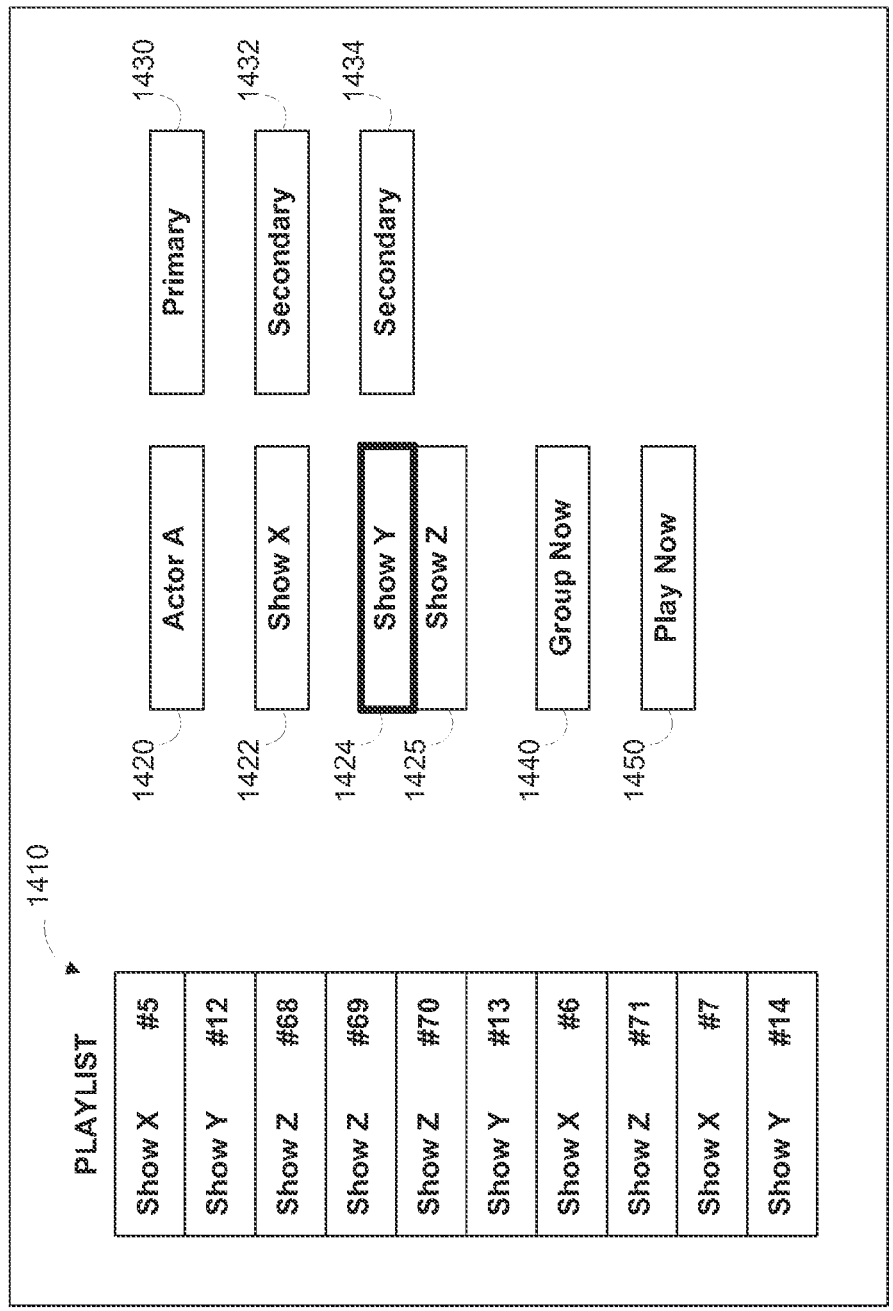
FIGS. 14A & 14B show illustrative screen shots of interactive parameter nodes and other interactive features a user can select to group assets of a playlist in clusters in accordance with an embodiment of the present invention.
Figure 14B:
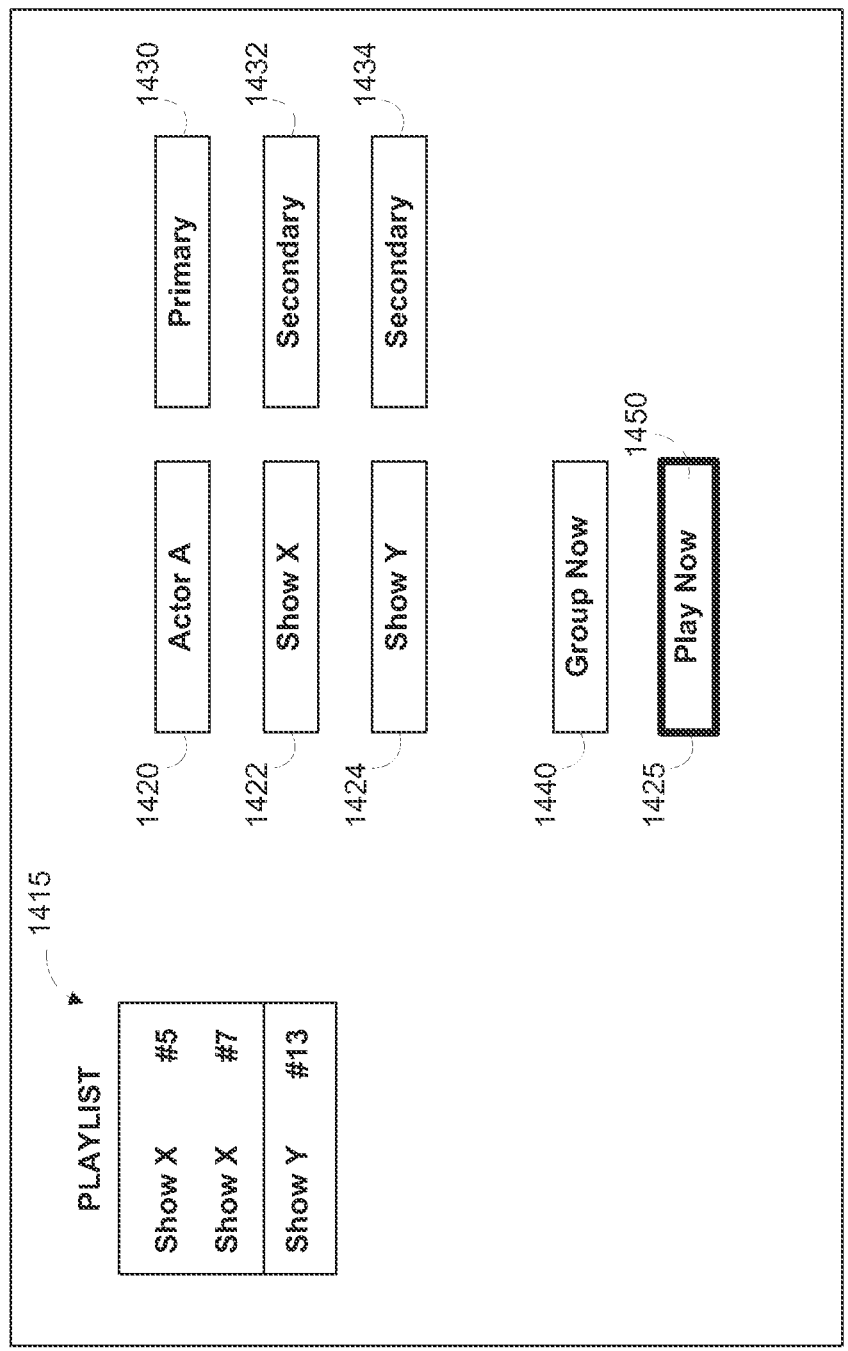

FIG. 13 shows a flowchart illustrating steps that may be taken to group assets of a playlist in clusters based on one or more selected asset clustering parameters in accordance with the principles of the present invention. Reference is made to FIGS. 14A and 14B during the discussion of FIG. 13. As defined herein, grouping of assets refers to a rearrangement of assets of a playlist or other list of assets. The rearrangement may result in a playlist having the same number of assets as originally included in the playlist or a reduced number of assets. A cluster, as defined herein, refers to at least one asset of a playlist or other list of assets associated with one or more parameters that sets it apart from other assets in the playlist.

Beginning at step 1310, a playlist is displayed in which the assets are arranged in a predetermined order (e.g., reverse air order). The assets may be arranged, for example, in order of air date, reverse air date, or recorded date, or any other suitable arrangement. An illustrative playlist 1410 arranged according to a predetermined order (e.g., by recorded date) is shown in FIG. 14A.

At step 1320, several interactive asset grouping nodes are displayed. These interactive nodes include parameters that may be selected by the user to form the basis for clustering the playlist. The parameters that may be selected in the node may be derived from characteristics associated with the assets in the playlist. For example, in television programming assets, the actor's, directors, producers, set locations, genres, show topics, and other suitable factors associated with the assets may be used as parameters. When assets of several different shows are included in the playlist, the show itself may be a parameter. Other parameters may include air date, season (if an asset belongs to a series), or expiration date (for VOD assets).

The interactive nodes may have a hierarchal arrangement that enables a user to specify how he or she would like to cluster the assets of the playlist. In FIG. 14A, three interactive nodes 1420, 1422, and 1425 are shown, though it is appreciated that any number of nodes may be used. Interactive node 1420 may include a primary or "coarse tuning" parameter and nodes 1422 and 1425 may include secondary or "fine tuning" parameters, as indicated by cluster hierarchal indicators 1430, 1432, and 1434. Persons skilled in the art will appreciate that the parameter of the interactive nodes need not be hierarchal and that the parameters set in each node may be equal. For example, if a user wishes to make all nodes equal in FIG. 14A, the user may navigate from highlighted region 1424 to indicators 1432 and 1434 and change them to be primary parameters.

At step 1330, a user is allowed to select an asset clustering parameter for each node. In FIG. 14A, "Actor A" is selected for node 1420 and "Show X" is selected for node 1422. A highlight region 1424 is shown highlighting node 1425, which displays "Show Y" and Show Z" as optional selections for that node. Node 1425 shows a drop down menu to illustrate one possible way in which a user can select different parameters for a given node. The user may navigate highlight region to either "Show Y" or "Show Z" and select the desired parameter by, for example, pressing a button on an input device (e.g., OK).

At step 1340, the assets are grouped into clusters based on at least one selected asset clustering parameter. When the assets are grouped in clusters, the assets within each cluster may be arranged to the predetermined order in which the assets were arranged in the original playlist. Alternatively, the user may be allowed to specify an order (not shown). In FIG. 14A, a user may navigate highlight region 1424 to the "Group Now" element 1440 and select it to cause the program guide to group the assets in one or more clusters based on the parameters selected at nodes 1420, 1422, or 1424. when the program guide groups the assets of playlist 1410 (FIG. 14A), it uses "Actor A" as the primary sorting criteria, meaning that only assets associated with "Actor A" are included in the grouped playlist. In addition, of the assets associated with "Actor A," those assets are clustered according to the secondary parameters, "Show X" and Show Y." FIG. 14B shows a playlist 1415 that may be provided when the assets of playlist 1410 (of FIG. 14A) are clustered according to the selected parameters, which may be shown simultaneously with playlist 1415. Each asset in playlist 1415 is associated with "Actor A" and those assets are clustered by shows X and Y. Note that the assets for show X are arranged in the order as they appeared in playlist 1410 (i.e., Show X #5 is listed before Show X #7), thereby adhering to the predetermined order of the assets prior to being grouped.

If desired, a user may adjust the parameters in nodes 1420, 1422, and 1425 and select item 1440 to regroup the assets of the original list (i.e., playlist 1410) to obtain a new playlist. In addition, the user may navigate a highlight region to item 1450 to begin playback of the assets in playlist 1410 or 1415.

Figure 15:
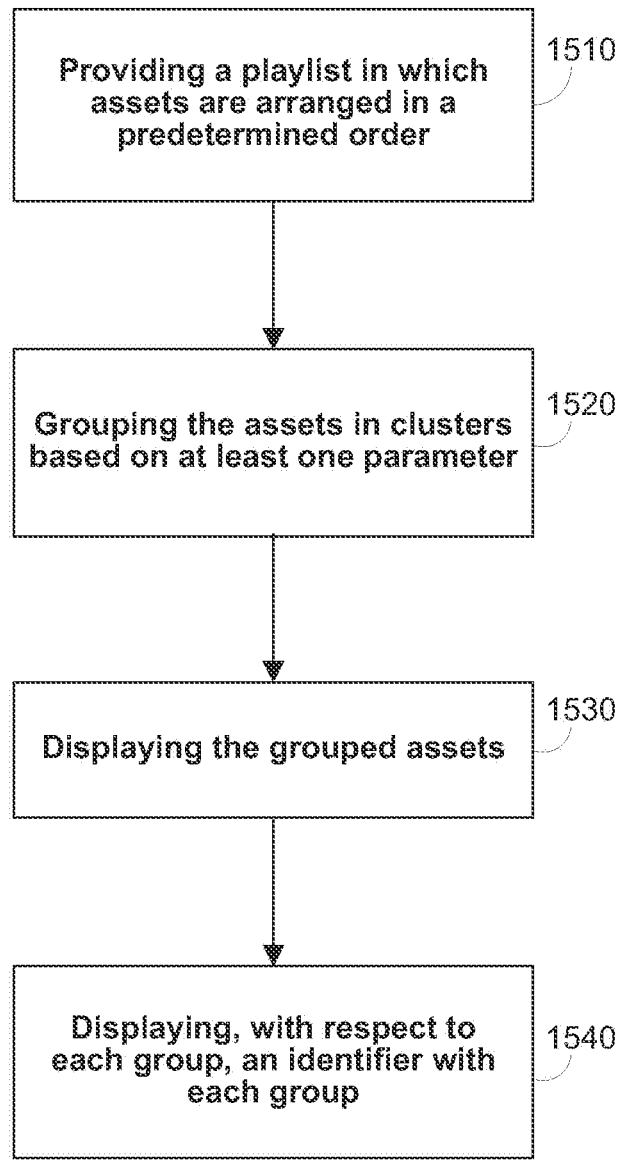
FIG. 15 is another flowchart illustrating steps that may be taken to group assets in clusters based on one or more selected asset grouping parameters in accordance with an embodiment of the present invention.
Figure 16:
FIG. 16 shows a screen shot illustrating a playlist grouped in clusters, with each cluster having a identifier in accordance with an embodiment of the present invention.
Figure 17:
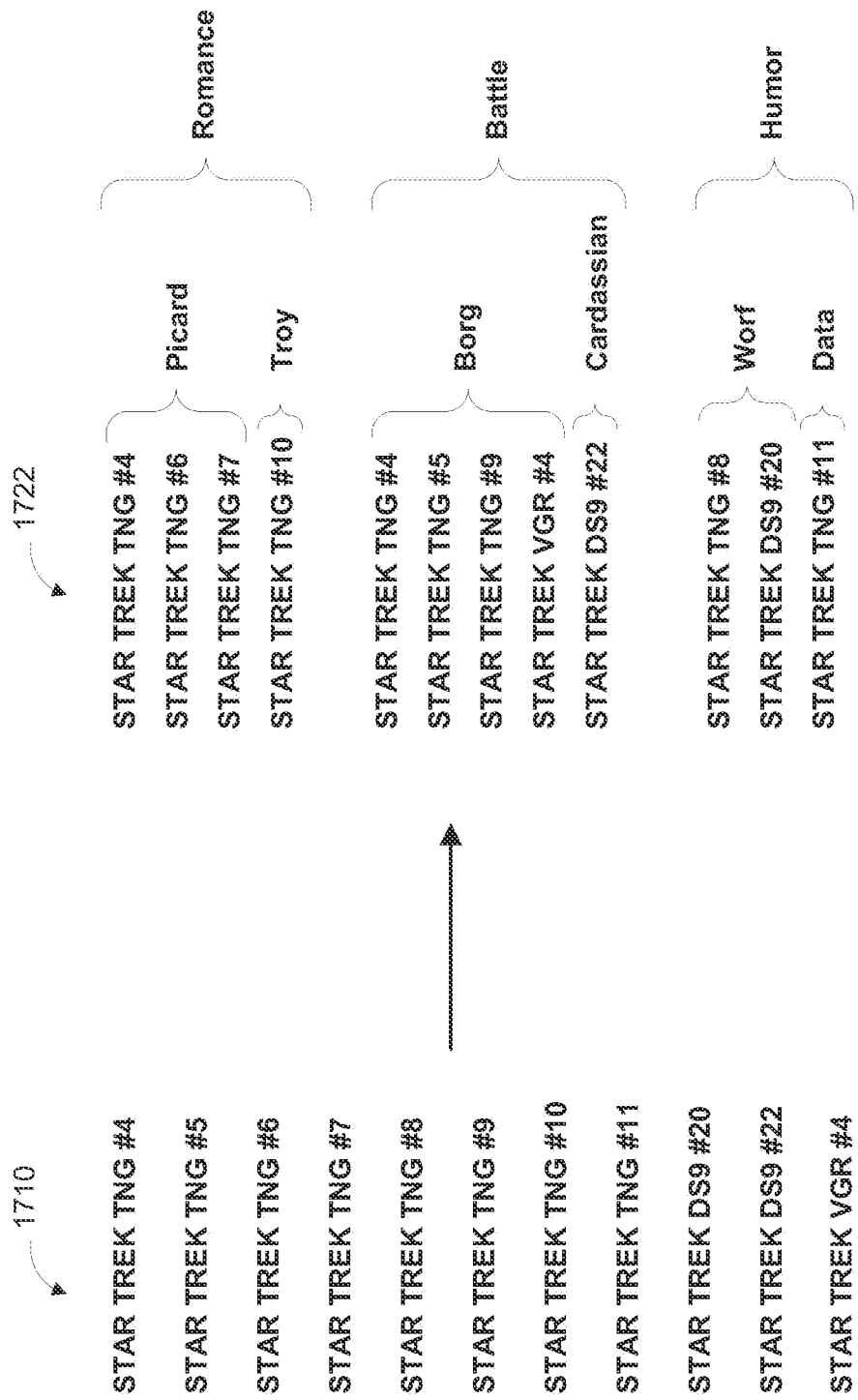
FIG. 17 shows a screen shot illustrating a playlist grouped in clusters, with each cluster having multiple identifiers in accordance with an embodiment of the present invention.

FIG. 15 is another flowchart illustrating steps that may be taken to group assets in clusters based on one or more selected asset clustering parameters in accordance with the principles of the present invention. In this embodiment, a parameter such as "genre" may be used to group assets and an identifier may be displayed adjacent to the playlist to show a basis for the clustering of assets in the playlist. Identifiers may be textual, or graphical in nature (e.g., iconic, thumbnail, animated gif-like, or actual video or video loop). Reference is made to FIGS. 16 and 17 during the discussion of FIG. 15. Beginning at step 1510, a playlist is provided in which assets are arranged in a predetermined order. FIGS. 16 and 17 show playlist 1610 and 1710, respectively in which assets are arranged in a predetermined order. At step 1520, the assets are grouped in clusters based on at least one parameter. Those grouped assets are displayed at step 1530. FIGS. 16 and 17 shows playlist 1620 and 1720, respectively, where assets have been clustered.

Note that FIG. 16 shows each asset of the playlist is placed in only one cluster. There is no requirement that this always be the case. In fact, there may be situations when an asset does not meet the criteria for any given cluster and thus may not be included in a cluster, or it may be included in a cluster labeled "other" or reserved logically for "other" assets. In addition, there may be situations when an asset meets the criteria for two or more clusters, resulting in that asset being included in each cluster for which it meets the criteria. This is shown, for example, in FIG. 17, where Star Trek TNG episode 4 is included in the Romance and Battle clusters. In FIG. 17, the assets have been grouped according to two parameters, "genre" being the primary and "key actor" being the secondary.

At step 1540, at least one identifier is displayed with respect to each cluster. This identifier may indicate the basis for forming the cluster, thus informing the user of a feature common to each asset in that cluster. Different approaches may be taken in displaying identifiers. For example, in one approach, a "single level" of identifiers may be displayed, as illustrated in FIG. 16. In FIG. 16, one identifier (e.g., an actor name) is displayed adjacent to each cluster. By way of example, in cluster 1622, StarTrek TNG #20 and StarTrek DS9 #3 episodes both feature actor, Michael Dorn.

In another approach, "multiple levels" of identifiers may be displayed, as illustrated in FIG. 17. In FIG. 17, cluster 1722 has two levels of identifiers, where a primary level identifier (e.g., romance) is associated with each asset in the top level cluster and two secondary level identifiers (the Picard and Troy identifiers) are each associated with a subset of the assets in the top-level cluster. By way of example, StarTrek TNG episodes 4, 6, and 7 are episodes featuring Picard in a romance plot. As another example, StarTrek DS9 episode #22 features Cardassians in an episode featuring a battle related genre.

Person skilled in the art will appreciate that steps shown in FIG. 15 are merely illustrative and that existing steps may be modified, additional steps may be added, and steps may be omitted. For example, a step may be added to illustrate that a user may select at least one parameter which may form a basis for grouping the assets in clusters. As another example, a user may navigate a highlight region to a displayed identifier and select that identifier to begin playback of the assets associated with that identifier. In FIG. 16, for example, a user may navigate a highlight region (not shown) to the "Whoopi Goldberg" identifier cause the interactive television program guide to being playback of the assets in the cluster associated with that identifier. In FIG. 17, for example, a user may navigate a highlight region (not shown) to the "battle" identifier to playback all the assets associated with the "battle" identifier, or the user may select the "borg" identifier to playback only the subset of assets in the "battle" cluster associated with the "borg" identifier, or optionally, those assets associated with the Borg identifier across all or a subset of clusters.

Figure 18:
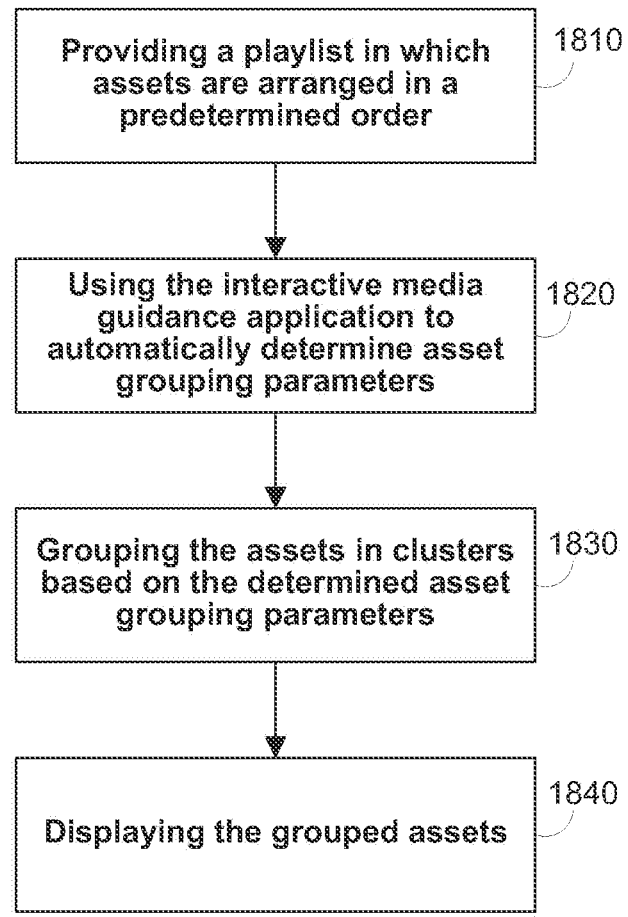
FIG. 18 is a flowchart illustrating steps that may be taken to group assets in clusters based on asset clustering parameters automatically determined by an interactive media guidance application in accordance with the principles of the present invention.

FIG. 18 is a flowchart illustrating steps that may be taken to group assets in clusters based on asset clustering parameters automatically determined by an interactive media guidance application in accordance with the principles of the present invention. At step 1810, a playlist is provided in which assets are arranged in a predetermined order. At step 1820, the interactive media guidance application may automatically determine asset grouping parameters. The guidance application may determine asset grouping parameters in any of number suitable different ways. For example, the guidance application may select parameters based on a user or device profile. As another example, the guidance application may randomly select one or more asset grouping parameters available from a pool of asset grouping parameters correlating to assets in the playlist. As another example, the guidance application may suggest asset grouping parameters for user or automatic selection based on a frequency of occurrence or variability analysis of candidate parameters associated with the listed assets. For example, in one embodiment, an algorithm may be tuned to attempt to always divide a list into a specific number (e.g., 4) of clusters that is aesthetically or ergonomically appropriate for a particular system. In a first part of the algorithm, candidate parameters are considered based on the variability of the associated asset attribute class within the assets. For example, a parameter representative of the attribute class "genre" may be considered. Upon analysis of the assets, it may be determined that there are only three different types of "genre" found with the assets (e.g., "drama," "family," and "action"). However, another attribute class associated with asset attributes of the group of assets might be "Guest stars" and within this class, there may be four different types (e.g., "William Shatner," "George Bush," "Madonna," and "Sting"). In this case, based on the variability criteria alone, the algorithm may decide that "Guest stars" is a better parameter for grouping assets than is "Genre." In one embodiment, however, a relative balance to the sizes of the clusters may be another consideration for the automatic parameter determining algorithm. So, for example, if the "Guest Star" parameter would result in 99% of the assets grouped into the "Madonna" cluster, while the "Genre" parameter would result in the assets being fairly evenly distributed among the 3 clusters, the "Genre" parameter might be the preferred parameter in this embodiment even though it didn't meet the desired 4 cluster goal. Some example grouping parameters include show producer, length of programs, resolution of programs (e.g., HD/SD), compression technology employed in the programs (e.g., MPEG-2, MPEG-4 part 10 (AVC), and H.263), audio quality (e.g., Dolby pro-logic or Dolby digital 5.1) rating (e.g., TV-14, TV-MA, PG-13, and R), producer, asset type (e.g., VOD-based, linear, streaming, and DVR-based assets as well as video and audio assets). In mixed asset type playlist applications, "asset type" may be a parameter of particular interest for clustering assets. However, other parameters may also be used. For example, consider a list of assets that includes movie assets, television series assets, and "top 40 hits" audio assets. A grouping parameter reflecting the asset attribute of "top 3 artists/actors" may be used as a clustering parameter. In this example, "Jessica Simpson" may appear in movies, television series programs, and songs, and thus a cluster labeled "Jessica Simpson" may be formed with assets of all three types. "Beyonce" may be another artist that spans both music and video and depending on how often she shows up in the assets in the group, she may be selected as one of the "top 3 artists/actors," and be the basis for another cluster. Finally, "Madonna" may be selected as the third of the "top 3" and be the identifier used for the third cluster, resulting in a clustering distinct from the asset type.

At step 1830, the assets may be grouped in clusters based on the determined asset grouping parameters. At step 1840, the grouped assets may be displayed. Person skilled in the art will appreciate that steps shown in FIG. 18 are merely illustrative and that existing steps may be modified, additional steps may be added, and steps may be omitted. For example, a step may be added to illustrate that at least one parameter which may form a basis for grouping the assets in clusters may be displayed.

It is understood that although the assets referred to in connection with the clustering embodiments discussed above primarily refer to television oriented programming such as recorded programming, the assets are not limited as such. Assets of other media types may be used. For example, linear assets, which may refer to assets available in broadcast programming, whether past, current, and/or future programming, may be used in connection with clustering embodiments according to the principles of the invention. If desired, bookmark assets, which may keep track of the playback position of a given asset (e.g., VOD or series recorded asset) may be used in connection with clustering embodiments according to the invention. Furthermore, audio assets may also be used in connection with clustering embodiment according to the invention. It will be further understood that a combination of assets (e.g., series recorded assets and VOD assets) may be clustered in accordance with the principles of the invention.

In some embodiments, user interactions with a guidance application (as described in various embodiments of the present invention) may be performed remotely from the target device upon which the playlists are ultimately executed. For example, the user interactions described (e.g., playlists creation and manipulation) may be performed via an Internet browser (e.g., Internet Explorer (IE) version 6.0, or Firefox) running on a laptop in a first location (e.g., Phoenix, Ariz.) and a playlist resulting from the user interactions may be executed on a device (e.g., digital video recorder such as a Motorola 6412) located in a second location (e.g., Radnor, Pa.) that is remote from the first location.

Playback of assets in a playlist or playback of a playlist, as defined herein, refers to seamlessly playing one asset after another in the order such assets exist in the playlist. That is, a playlist is a construct comprising assets and an implied order, wherein, once initiated, the assets in the playlist may be played back continuously, one after another, in the implied order without the need for interaction with a user. The above described embodiments of the present invention are presented for purposes of illustration and not of limitation, and the present invention is limited only by the claims which follow.

What is claimed is:

1. A method for using an interactive media guidance application,
    the method comprising:
    receiving a first user input having a common attribute of video content;
    storing a plurality of media assets including a subset stored based on the common attribute;
    subsequent to storing the plurality of media assets, receiving a second user input requesting playback of the subset of the plurality of stored media assets having the common attribute of video content;
    identifying, from the plurality of stored media assets, the subset of the plurality of stored media assets having the common attribute of video content;
    generating, for simultaneous display, a first list of the plurality of stored media assets, a second list of the subset of the plurality of stored media assets having the common attribute of video content, and an indication of the common attribute corresponding to the second list, wherein the second list of the subset includes all media assets having the common attribute from the first list of the plurality of stored media assets; and
    automatically selecting for playback the subset of the plurality of stored media assets having the common attribute of video content in response to the second user input.

2. The method of claim 1, wherein the subset of the plurality of assets is stored in response to the first user input.

3. The method of claim 1, wherein the attribute is a timeslot or a theme.

4. The method of claim 1, wherein an order for automatically selecting for playback the subset of the plurality of stored media assets that has the common attribute is determined based on an asset criteria.

5. The method of claim 4, wherein the asset criteria includes at least one of a time of storing, a first air date, a length, a rating, a resolution, a theme, and alphabetical order of an asset.

6. The method of claim 4, wherein the asset criteria is identified by the user.

7. The method of claim 4, wherein the asset criteria is automatically determined by the interactive media guidance application.

8. The method of claim 1, wherein an order for automatically selecting for playback the subset of the plurality of stored media assets that has the common attribute is specified manually by the user.

9. The method of claim 1, wherein the plurality of assets includes at least one of a broadcast television program, a stored television program, a video-on-demand (VOD) program, a near video-on-demand (NVOD) program, a pay-per-view program, a satellite television program, and a streaming video program.

10. The method of claim 1, wherein a number of media assets selected for automatic playback is limited to a maximum number.

11. The method of claim 10, wherein a first-in-first-out (FIFO) arrangement is applied to eliminate assets when the maximum number is exceeded.

12. The method of claim 1, further comprising generating for display a playlist transport bar that provides information regarding playback progress of the subset of the plurality of stored media assets.

13. The method of claim 1, further comprising, upon playback of a media asset of the subset of the plurality of stored media assets, removing the media asset from storage.

14. A system comprising user equipment for implementing an interactive media guidance application, the user equipment comprising a processor for:
   receiving a first user input having a common attribute of video content;
   storing a plurality of media assets including a subset stored based on the common attribute;
   subsequent to storing the plurality of media assets, receiving a second user input requesting playback of the subset of the plurality of stored media assets having the common attribute of video content;
   identifying, from the plurality of stored media assets, the subset of the plurality of stored media assets having the common attribute of video content;
   generating, for simultaneous display, a first list of the plurality of stored media assets, a second list of the subset of the plurality of stored media assets having the common attribute of video content and an indication of the common attribute corresponding to the second list, wherein the second list of the subset includes all media assets having the common attribute from the first list of the plurality of stored media assets; and
   automatically selecting for playback the subset of the plurality of stored media assets having the common attribute of video content in response to the second user input.

15. The system of claim 14, wherein the subset of the plurality of assets is stored in response to the first user input.

16. The system of claim 14, wherein the attribute is a timeslot or a theme.

17. The system of claim 14, wherein an order for automatically selecting for playback the subset of the plurality of stored media assets that has the common attribute is determined based on an asset criteria.

18. The system of claim 17, wherein the asset criteria includes at least one of a time of storing, a first air date, a length, a rating, a resolution, a theme, and alphabetical order of an asset.

19. The system of claim 17, wherein the asset criteria is identified by the user.

20. The system of claim 17, wherein the asset criteria is automatically determined by the interactive media guidance application.

21. The system of claim 14, wherein an order for automatically selecting for playback the subset of the plurality of stored media assets that has the common attribute is specified manually by the user.

22. The system of claim 14, wherein the plurality of assets includes at least one of a broadcast television program, a stored television program, a video-on-demand (VOD) program, a near video-on-demand (NVOD) program, a pay-per-view program, a satellite television program, and a streaming video program.

23. The system of claim 14, wherein a number of media assets selected for automatic playback is limited to a maximum number.

24. The system of claim 23, wherein a first-in-first-out (FIFO) arrangement is applied to eliminate assets when the maximum number is exceeded.

25. The system of claim 14, further comprising the processor for generating for display a playlist transport bar that provides information regarding playback progress of the subset of the plurality of stored media assets.

26. The system of claim 14, further comprising the processor for, upon playback of a media asset of the subset of the plurality of stored media assets, removing the media asset from storage.

* * * * *